(12) United States Patent
Miyauchi

(10) Patent No.: US 10,717,310 B2
(45) Date of Patent: Jul. 21, 2020

(54) PROTECTIVE LAYER TRANSFER SHEET AND METHOD FOR FABRICATING THE SAME

(71) Applicant: TOPPAN PRINTING CO., LTD., Tokyo (JP)

(72) Inventor: Yasuhiro Miyauchi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/428,800

(22) Filed: May 31, 2019

(65) Prior Publication Data

US 2019/0299693 A1 Oct. 3, 2019

Related U.S. Application Data

(63) Continuation of application No. PCT/JP2017/043093, filed on Nov. 30, 2017.

(30) Foreign Application Priority Data

Dec. 6, 2016 (JP) ................................. 2016-236692

(51) Int. Cl.
*B41M 5/382* (2006.01)
*C09D 11/08* (2006.01)
(Continued)

(52) U.S. Cl.
CPC ........... *B41M 5/38228* (2013.01); *B32B 7/02* (2013.01); *B32B 7/06* (2013.01); *B32B 23/04* (2013.01);
(Continued)

(58) Field of Classification Search
CPC ..... B41M 5/38228; B41M 5/382; B32B 7/02; B32B 7/06; B32B 27/36; C09D 11/08; C09D 11/104
See application file for complete search history.

(56) References Cited

U.S. PATENT DOCUMENTS

| | | | |
|---|---|---|---|
| 2010/0101714 A1* | 4/2010 | Yokozawa | B41M 5/423 156/234 |
| 2015/0145939 A1 | 5/2015 | Yabe et al. | |
| 2019/0001621 A1* | 1/2019 | Oota | B41M 5/363 |

FOREIGN PATENT DOCUMENTS

| | | |
|---|---|---|
| EP | 2 868 476 A | 5/2015 |
| JP | H07-172076 A | 7/1995 |

(Continued)

OTHER PUBLICATIONS

International Searching Authoriry, "International Search Report," issued in connection with International Patent Application No. PCT/JP2017/043093, dated Jan. 16, 2018.
(Continued)

*Primary Examiner* — Lamson D Nguyen
(74) *Attorney, Agent, or Firm* — Foley & Lardner LLP

(57) ABSTRACT

In a protective layer transfer sheet, a heat-resistant lubricating layer is provided on a first surface of a substrate, and a thermally transferable protective layer is provided on at least part of a second surface of the substrate. The thermally transferable protective layer is composed of a peeling layer and an adhesive layer. The peeling layer contains cellulose acetate propionate resin having a glass transition temperature (Tg) in the range of 140° C. or more and 150° C. or less, and a number average molecular weight (Mn) of 30,000 or less, and polyester resin having a number average molecular weight of 15,000 or more.

4 Claims, 1 Drawing Sheet

(51) Int. Cl.
   *C09D 11/104*   (2014.01)
   *C09D 11/54*    (2014.01)
   *B32B 7/02*     (2019.01)
   *B32B 23/04*    (2006.01)
   *B32B 27/36*    (2006.01)
   *B32B 7/06*     (2019.01)

(52) U.S. Cl.
   CPC ............ *B32B 27/36* (2013.01); *B41M 5/382* (2013.01); *C09D 11/08* (2013.01); *C09D 11/104* (2013.01); *C09D 11/54* (2013.01)

(56) References Cited

FOREIGN PATENT DOCUMENTS

| JP | 4142517 B2 | 9/2008 |
| JP | 4941260 B2 | 5/2012 |
| JP | 2013-180467 A | 9/2013 |
| JP | 2015-085554 A | 5/2015 |
| JP | 5794084 B2 | 10/2015 |

OTHER PUBLICATIONS

International Searching Authority, "Written Opinion," issued in connection with International Patent Application No. PCT/JP2017/043093, dated Jan. 16, 2018.

Extended European Search Report dated Jan. 7, 2020 for corresponding Application No. 17879104.2.

* cited by examiner

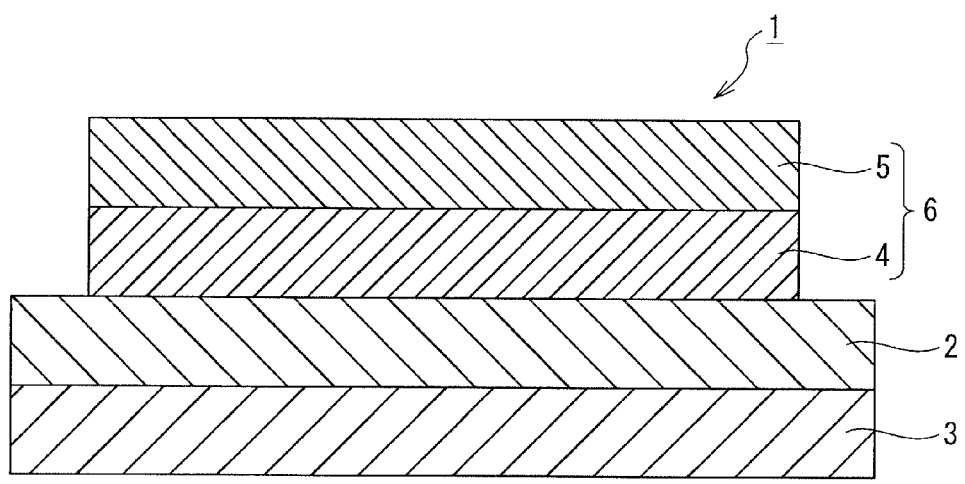

US 10,717,310 B2

PROTECTIVE LAYER TRANSFER SHEET AND METHOD FOR FABRICATING THE SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/043093, filed on Nov. 30, 2017, which is based upon and claims the benefit of priority to Japanese Patent Application No. 2016-236692, filed on Dec. 6, 2016; the disclosures of which are incorporated herein by reference in their entireties.

TECHNICAL FIELD

The present invention relates to a protective layer transfer sheet used for a thermal transfer printer.

BACKGROUND ART

The thermal transfer recording medium is used for thermal transfer printers. In general, a thermal transfer recording medium is formed of an ink ribbon called a thermal ribbon. This thermal transfer recording medium is composed of a thermal transfer layer provided on one surface of a substrate layer and a heat-resistant lubricating layer (back coat layer) provided on the other surface thereof. The thermal transfer layer is an ink layer and is transferred to a thermal transfer image receiving sheet by sublimation (sublimation transfer method) or by melting (melt transfer method) of the ink of the thermal transfer layer by application of heat from a thermal head of a printer.

At present, among thermal transfer methods, sublimation transfer easily enables full color printing of various images with an increase in functions of printers. Therefore, sublimation transfer is widely used in digital camera self-prints, cards such as identification cards and the like, outputted materials for amusement, and the like. As applications are diversified, thermal transfer printers tend to be smaller in size, faster in speed, and lower in cost, and there is also a growing demand for durability of the obtained printed matter. For this reason, in recent years, thermal transfer recording media having a plurality of thermal transfer layers, in which a protective layer and the like that impart durability to the printed matter are provided on the same side of the substrate sheet so as not to overlap each other, have become widespread.

In such circumstances, along with the diversification and widespread use of the applications, there has been a demand for printed matter having a matte appearance, as well as printed matter having a glossy appearance, in addition to durability of print matter.

In response to such a demand, PTL 1 proposes a protective layer transfer sheet in which a release layer contains a filler to adjust the gloss level of the printed matter. Further, PTL 2 proposes a protective layer transfer sheet that can stably obtain glossy printed matter and semi-glossy printed matter from the same sheet by using (meth)acrylic resin having an acid value of 5.0 or less for the protective layer. Further, PTL 3 proposes a protective layer transfer sheet which contains cellulose acetate butyrate resin having a molecular weight of 50,000 or more and a glass transition temperature (Tg) of 150° C. or more for the protective layer to thereby impart high plasticizer resistance to printed matter.

CITATION LIST

Patent Literature

[PTL 1] JP 4142517 B2; [PTL 2] JP 4941260 B2; [PTL 3] JP 5794084 B2.

SUMMARY OF THE INVENTION

Technical Problem

However, although the protective layer transfer sheet proposed in PTL 1 can obtain matte printed matter, it cannot obtain glossy printed matter.

Further, when printing was performed using the protective layer transfer sheet proposed in PTL 2, the substrate and the protective layer are adhered by thermal energy after thermal transfer, which causes too strong adhesion, and peeling marks occur.

In addition, for the protective layer transfer sheet proposed in PTL 3, when the proposed resin is applied on the substrate, the molecular weight of the cellulose-based resin is too large to apply uniformly. As a result, unevenness due to application unevenness occurs on the surface of the printed matter after transfer, and glossy printed matter cannot be obtained.

Various configurations and materials have been proposed for method of obtaining glossy printed matter and matte printed matter. However, methods have not been found so far to obtain glossy printed matter and matte printed matter while ensuring high image quality, foil cutting properties, and plasticizer resistance without failure in the same protective layer transfer sheet.

The present invention has been made focusing on these points, and an object of the invention is to provide an improved or even excellent protective layer transfer sheet capable of obtaining glossy printed matter and matte printed matter from the same protective layer transfer sheet, and obtain printed matter having high image quality, foil cutting properties, and plasticizer resistance.

Solution to Problem

In order to solve the above problem, an aspect of the present invention is a protective layer transfer sheet including: a heat-resistant lubricating layer provided on a first surface of a substrate, and a thermally transferable protective layer provided on at least part of a second surface of the substrate, wherein the thermally transferable protective layer includes a peeling layer and an adhesive layer, and the peeling layer contains cellulose acetate propionate resin having a glass transition temperature (Tg) of 140° C. or more and 150° C. or less and a number average molecular weight (Mn) of 30,000 or less, and polyester resin having a number average molecular weight of 15,000 or more.

Advantageous Effects of the Invention

According to an aspect of the present invention, it is possible to obtain glossy printed matter and matte printed matter from the same protective layer transfer sheet, and obtain printed matter having high image quality, foil cutting properties, and plasticizer resistance.

BRIEF DESCRIPTION OF THE DRAWINGS

The FIGURE is a side cross-sectional view illustrating a protective layer transfer sheet of an embodiment according to the present invention.

DESCRIPTION OF REPRESENTATIVE EMBODIMENTS

With reference to the drawing, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawing is schematic, and the relationship between thickness and plane size, the ratio of the thickness of each layer, etc., are different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawing referred to in the following description, for clarity, characteristic parts are enlarged, and thus the components are not shown to scale. It is, however, clear that one or more embodiments can be implemented without such details. In addition, known structures and devices may be schematically represented for simplicity.

With reference to the FIGURE, an embodiment of the present invention will be described.

The drawing is schematic, and the relationship of the thickness and the planar dimensions, the ratios of the thicknesses of the layers, and the like are different from the actual ones. The embodiment described below is merely an example showing a configuration for embodying the technical concept of the present invention, and the technical concept of the present invention does not limit the materials, shapes, structures, and the like of the components described below. The technical idea of the present invention is subject to various modifications within the technical scope defined by the claims.

<Overall Configuration>

As shown in the FIGURE, in a protective layer transfer sheet of the present embodiment, a heat-resistant lubricating layer 3 is provided on a first surface of a substrate 2, and a thermally transferable protective layer 6 is provided on at least part of a second surface of the substrate 2. The thermally transferable protective layer 6 is composed a peeling layer 4 and an adhesive layer 5.

The peeling layer 4 of the present embodiment is formed of a coating liquid containing cellulose acetate propionate resin as the main component and polyester resin added thereto. The cellulose acetate propionate resin contained in the peeling layer 4 is one having a glass transition temperature (Tg) in the range of 140° C. or more and 150° C. or less, and a number average molecular weight (Mn) of 30,000 or less. The polyester resin added to the peeling layer 4 is the one having a number average molecular weight of 15,000 or more. The main component described above refers to, for example, 80% by mass or more, and preferably 90% by mass or more of the entire peeling layer.

The amount of the polyester resin added is preferably in the range of 0.1 parts by mass or more and 5.0 parts by mass or less per 100 parts by mass of cellulose acetate propionate resin described above.

In addition, while a solvent used at the time of producing the sheet remains in the protective layer transfer sheet 1 to some extent, the solvent used to form each layer is preferably selected such that residual solvent remaining in the thermally transferable protective layer 6 contains both a good solvent and a poor solvent for the cellulose acetate propionate resin.

Hereinafter, an example of each layer which constitutes the protective layer transfer sheet of the present embodiment will be described in detail.

<Substrate>

While conventionally known substrates can be used as the substrate 2, it is preferred that the materials for the substrate have mechanical strength, flexibility, heat resistance and the like. Examples of the substrate 2 include plastic films and papers. Examples of materials for the plastic films include polyethylene terephthalate, polyethylene naphthalate, polypropylene, cellophane, polycarbonate, polyvinyl chloride, polystyrene, polyimide, Nylon (registered trademark), and polyvinylidene chloride. Examples of the papers include condenser paper and paraffin paper. Polyethylene-terephthalate is particularly preferred as the substrate 2. The thickness of the substrate 2 is in the range of 2 μm or more and 25 μm or less, and more preferably 2 μm or more and 12 μm or less.

<Heat-Resistant Lubricating Layer>

The heat-resistant lubricating layer 3 is provided on a side opposite to the thermally transferable protective layer 6 of the substrate 2 in order to prevent thermal contraction of the substrate 2 due to heat from the thermal head and breakage of the substrate 2 due to friction with the thermal head.

Examples of the binder resin used for the heat-resistant lubricating layer 3 include acrylic resin, polyester resin, polyurethane resin, polyacetal resin, polyamide resin, and polyimide resin. In order to improve the heat resistance, a crosslinking agent may also be used in combination. Further, in order to improve the lubricity, a lubricant such as silicone oil may also be used in combination, or resins obtained by modifying the above-mentioned resins may also be used. In addition, in order to improve the adhesiveness between the substrate 2 and the heat-resistant lubricating layer 3, an easy-adhesive layer may be provided on the substrate 2, and the heat-resistant lubricating layer 3 may be provided thereon. The dry coating amount of the heat-resistant lubricating layer 3 is preferably in the range of 0.1 $g/m^2$ or more and 2.0 $g/m^2$ or less, and more preferably 0.2 $g/m^2$ or more and 1.5 $g/m^2$ or less in consideration of the friction during thermal transfer, transfer suitability, cost, and the like.

The dry coating amount of the heat-resistant lubricating layer 3 described herein refers to a solid content left after coating and drying of the coating liquid for forming the heat-resistant lubricating layer. Moreover, the dry coating amount of the peeling layer 4 and the adhesive layer 5, described later, also refers to a solid content left after coating and drying of each coating liquid.

<Thermally Transferable Protective Layer>

The thermally transferable protective layer 6 is provided on a surface of the substrate 2 on a side opposite to that on which the heat-resistant lubricating layer 3 is provided. The thermally transferable protective layer 6 is a layer for protecting an image formed on a thermal transfer image receiving sheet by a thermal transfer ink layer. The thermally transferable protective layer 6 is peeled off from the substrate 2 by a thermal transfer technique and transferred onto the thermal transfer image receiving sheet. The performance required is light resistance, plasticizer resistance, and the like in addition to the gloss of the surface of the output product.

The thermally transferable protective layer 6 of the present embodiment includes at least the peeling layer 4 and the adhesive layer 5. The peeling layer 4 is provided on a surface facing the substrate 2.

<Adhesive Layer>

The adhesive layer 5 contains at least a binder resin. The binder resin is not particularly limited except for having heat fusibility and transparency, and may be a conventionally known one. Examples of the binder include styrene-based resins such as polystyrene and poly α-methyl styrene; acrylic-based resins such as polymethylmethacrylate and polyacrylic ethyl; vinyl-based resins such as polyvinyl chloride, polyvinyl acetate, vinyl chloride-vinyl acetate copolymer, polyvinyl butyral, and polyvinyl acetal; synthetic resins such as polyester resin, polyamide resin, epoxy resin, polyurethane resin, petroleum resin, ionomer, ethylene-acrylic acid copolymer, and ethylene-acrylic ester copolymer; cellulose derivatives such as cellulose nitrate, ethyl cellulose, and cellulose acetate propionate; and natural resins such as rosin, rosin-modified maleic resin, ester gum, polyisobutylene rubber, butyl rubber, styrene-butadiene rubber, butadiene-acrylonitrile rubber, and polychlorinated olefin and derivatives of synthetic rubber. These resins may be used singly or in combination of two or more.

The adhesive layer 5 may be made of known additives other than resins as long as the performance described above is not impaired. Examples of the additives include inorganic pigment fine particles, an isocyanate compound, silane coupling agent, dispersant, viscosity adjusting agent, release agent, slip agent such as wax and resin filler, ultraviolet absorbent, photostabilizer, antioxidant, fluorescent whitening agent, and antistatic agent.

The dry coating amount of the adhesive layer 5 is preferably in the range of 0.1 g/m2 or more and 2.0 g/m$^2$ or less.

<Peeling Layer>

The peeling layer 4 of the present embodiment is provided on a surface of the substrate 2 on a side opposite to that on which the heat-resistant lubricating layer 3 is provided, and one of the features of the peeling layer 4 is that it contains cellulose acetate propionate resin having the glass transition temperature (Tg) of 140° C. or more and 150° C. or less and the number average molecular weight (Mn) of 30,000 or less, and polyester resin having the number average molecular weight of 15,000 or more.

The cellulose acetate propionate resin has plasticizer resistance, and, when used in the peeling layer 4 as the main component, can impart plasticizer resistance to the printed matter to be protected.

The reason for the glass transition temperature (Tg) of the cellulose acetate propionate resin being in the range of 140° C. or more and 150° C. or less is as follows.

That is, with the glass transition temperature of less than 140° C., when a high thermal energy (for example, 10 msec/line, 0.60 mJ/dot) is applied by a printer in order to obtain matte printed matter, fusion occurs between the substrate 2 and the peeling layer 4. Accordingly, the peeling layer 4 becomes unable to be peeled off from the substrate 2, which may cause abnormal stop of the printer during peeling. On the other hand, with the glass transition temperature (Tg) of higher than 150° C., when heat energy (for example at 10 msec/line, 0.40 mJ/dot) is applied by a printer in order to obtain a glossy printed matter, the peeling layer 4 does not soften. Accordingly, the peeling layer 4 remains in contact with the substrate 2 and does not peel off, which may cause abnormal stop of the printer during peeling.

The reason for the number average molecular weight (Mn) of the cellulose acetate propionate resin being 30,000 or less is as follows. With the number average molecular weight (Mn) of larger than 30,000, the viscosity of ink is increased when dissolved in an organic solvent, leading to poor leveling and poor uniform application. When application is not uniform, uniformity of the surface of the printed matter is lost, and the image quality in the printed matter is degraded.

On the other hand, with the number average molecular weight (Mn) of cellulose acetate propionate resin being 30,000 or less, the viscosity of ink does not become excessively high when dissolved in an organic solvent, leading to good leveling and good uniform application. That is, uniformity of the surface of the printed matter is ensured, and the image quality of the printed matter can be prevented from deteriorating. In addition, although the lower limit of the number average molecular weight (Mn) of cellulose acetate propionate resin is not particularly limited, it is preferably 5,000 or more.

The reason for the number average molecular weight (Mn) of the polyester resin being 15,000 or more, and preferably 20,000 or more, is as follows. When polyester resin is added, there is an effect that the cellulose acetate propionate resin and the substrate 2 are kept in close contact with each other before transfer. When the number average molecular weight (Mn) of the polyester resin is smaller than 15,000, adhesion between the cellulose acetate propionate resin and the substrate 2 is insufficient, and the foil cutting properties during thermal transfer are poor. Accordingly, foreign substances resulting from the thermal transferable protective layer 6 are generated in the printer, which causes defects in the printed matter.

On the other hand, when the number average molecular weight (Mn) of polyester resin is 15,000 or more, the cellulose acetate propionate resin and the substrate 2 can be kept in close contact with each other before transfer, and the foil cutting properties are good. Accordingly, improved or even excellent printed matter can be produced without causing poor image quality. In addition, although the upper limit of the number average molecular weight (Mn) of polyester resin is not particularly limited, it is preferably 50,000 or less.

The reason for adding polyester resin at the ratio of 0.1 parts by mass or more and 5.0 parts by mass or less with respect to 100 parts by mass of the cellulose acetate propionate resin is as follows. When the amount is less than 0.1 parts by mass, adhesion between cellulose acetate propionate resin and the substrate 2 may not be stable, which may cause insufficient adhesion.

On the other hand, when the amount of polyester resin added is larger than 5.0 parts by mass, the compounding ratio of the cellulose acetate propionate resin for forming the peeling layer 4 relatively decreases. Accordingly, the plasticizer resistance performance is reduced.

When the polyester resin is added at the ratio of 0.1 parts by mass or more and 5.0 parts by mass or less to the cellulose acetate propionate resin, adhesion between the cellulose acetate propionate resin and the substrate 2 before transfer can be maintained, and the plasticizer resistance performance can also be maintained.

The dry coating amount of the peeling layer 4 is preferably in the range of 0.1 g/m² or more and 2.0 g/m² or less. Further, known additives other than resins may also be used for the peeling layer 4 as long as the performance described above is not impaired. Examples of the additives include inorganic pigment fine particles, an isocyanate compound, silane coupling agent, dispersant, viscosity adjusting agent, release agent, slip agent such as wax and resin filler, ultraviolet absorbent, photostabilizer, antioxidant, fluorescent whitening agent, and antistatic agent.

The thermally transferable protective layer 6 having the peeling layer 4 and the adhesive layer 5 with the above configuration contains a solvent which is a good solvent and a solvent which is a poor solvent for the cellulose acetate propionate resin as a residual solvent.

The good solvent as described herein refers to a solvent in which the cellulose acetate propionate resin can be dissolved at the solid content of 10% by mass. Examples of the good solvent may be conventionally known organic solvents, and may include, but not limited to, methyl ethyl ketone, ethyl acetate, butyl acetate, cyclohexanone, propylene glycol monomethylether, tetrahydrofuran, and dioxolane. Further, the poor solvent refers to a solvent in which the cellulose acetate propionate resin cannot be dissolved at the solid content of 10% by mass. Examples of the poor solvent may be conventionally known organic solvents, and may include, but not limited to, toluene, ethylcellosolve, butyl cellosolve, propylene glycol monopropylether, and propylene glycol monobutylether.

When the thermally transferable protective layer 6 of the present embodiment contains both a good solvent and a poor solvent for the cellulose acetate propionate resin as a residual solvent, the coating liquid for forming the adhesive layer 5 can contain at least a good solvent and a poor solvent for the cellulose acetate propionate resin. When the coating liquid for forming the adhesive layer 5 is made of only a good solvent for the cellulose acetate propionate resin, the coating liquid for forming the adhesive layer 5, applied and dried on the peeling layer 4 made of cellulose acetate propionate resin, erodes the peeling layer 4 and reduces the plasticizer resistance of the thermally transferable protective layer 6. In addition, polyester resin with a number average molecular weight (Mn) of 15,000 or more is added to the peeling layer 4 in order to keep the cellulose acetate propionate resin and the substrate 2 in close contact with each other before transfer. However, when the coating liquid for forming the adhesive layer 5 is made of only a good solvent for the cellulose acetate propionate resin, cold adhesiveness between the cellulose acetate propionate resin and the substrate 2 before transfer decreases.

In addition, when the coating liquid for forming the adhesive layer 5 is formed of only a poor solvent for the cellulose acetate propionate resin, the coating liquid for forming the adhesive layer 5, applied and dried on the peeling layer 4 containing cellulose acetate propionate resin as the main component, does not erode the peeling layer 4. As a result, adhesiveness between the peeling layer 4 and the adhesive layer 5 is weakened, and a problem of peeling occurs between the peeling layer 4 and the adhesive layer 5 during thermal transfer.

Since the thermally transferable protective layer 6 contains both a good solvent and a poor solvent for the cellulose acetate propionate resin as a residual solvent, it is possible to maintain plasticizer resistance performance of the thermally transferable protective layer 6 and adhesion between the cellulose acetate propionate resin and the substrate 2 before transfer.

Here, various auxiliary agents such as wetting agents, dispersants, thickeners, antifoaming agents, coloring agents, antistatic agents, preservatives, and the like, which are used in production of general coated paper, are appropriately added to each coating layer. Each coating layer can be formed by applying a predetermined coating liquid to each layer or two or more layers simultaneously and drying. The coating liquid is applied by known wet coating techniques such as bar coating, blade coating, air knife coating, gravure coating, roll coating, and die coating.

As described above, in the protective layer transfer sheet 1 of the present embodiment, the thermally transferable protective layer 6 is composed of the peeling layer 4 and the adhesive layer. The peeling layer 4 is made of cellulose acetate propionate resin having a glass transition temperature (Tg) in the range of 140° C. or more and 150° C. or less and a number average molecular weight (Mn) of 30,000 or less, and polyester resin having a number average molecular weight of 15,000 or more is added thereto.

With this configuration, it is possible to obtain glossy printed matter and matte printed matter from the same protective layer transfer sheet 1, and printed matter with high image quality, foil cutting properties, and plasticizer resistance performance.

The protective layer transfer sheet 1 of the present embodiment can be used for sublimation transfer printers, and can easily form various images in full color, together with higher speed and higher performance of the printers. Therefore, the protective layer transfer sheet 1 of the present embodiment can be widely used in digital camera self-prints, cards such as identification cards and the like, outputted materials for amusement and the like.

EXAMPLES

Materials used in the examples and the comparative examples of the present invention are described below. Further, the term "parts" as used herein refers to parts on a mass basis unless otherwise specified. The invention should not be construed as limited to the examples.

Example 1

Ink composition for a heat-resistant lubricating layer was prepared with the following composition, and applied and dried on a polyethylene terephthalate film of 4.5 μm thickness so that the dry coating amount of the heat-resistant lubricating layer becomes 1.0 g/m².

[Ink for Heat-Resistant Lubricating Layer]
Acrylic polyol resin . . . 15 parts
2-6, tolylene diisocyanate . . . 5 parts
Silicone filler (particle diameter 1.0 μm) . . . 0.2 parts
Amino-modified silicone oil . . . 1 part
Methyl ethyl ketone . . . 40 parts
Toluene . . . 40 parts Then, an ink for a peeling layer was prepared with the following composition, and applied and dried on a surface of the substrate on a side opposite to that on which the heat-resistant lubricating layer was formed so that the dry coating amount of the peeling layer becomes 1.0 g/m².

[Ink for Peeling Layer]
CAP-482-0.5 . . . 10.0 parts
(Cellulose acetate propionate resin, Mn: 25,000, Tg: 142° C., Eastman Chemical)

Elitel UE-9900 . . . 0.1 parts
(Polyester resin, Mn: 15,000, Unitika, Ltd.)
Methyl ethyl ketone . . . 89.9 parts Then, an ink for an adhesive layer was prepared with the following composition, and applied and dried on a surface of the substrate on which the peeling layer was formed so that the dry coating amount of the adhesive layer becomes 1.0 g/m$^2$. Thus, a protective layer transfer sheet of Example 1 was prepared.

[Ink for Adhesive Layer]
Elitel UE-9800 . . . 10.0 parts
(Polyester resin, Unitika, Ltd.)
Methyl ethyl ketone . . . 60.0 parts
Toluene . . . 30.0 parts Example 2

A protective layer transfer sheet of Example 2 was prepared in the same manner as Example 1 except that the ink for the peeling layer had the following composition instead of that used in the protective layer transfer sheet of Example 1.

[Ink for Peeling Layer]
CAP-482-0.5 . . . 10.0 parts
(Cellulose acetate propionate resin, Mn: 25,000, Tg: 142° C., Eastman Chemical)
Vylon 200 . . . 0.1 parts
(Polyester resin, Mn: 17,000, Toyobo Co., Ltd.)
Methyl ethyl ketone . . . 89.9 parts Example 3

A protective layer transfer sheet of Example 3 was prepared in the same manner as Example 1 except that the ink for the peeling layer had the following composition instead of that used in the protective layer transfer sheet of Example 1.

[Ink for Peeling Layer]
CAP-482-0.5 . . . 10.0 parts
(Cellulose acetate propionate resin, Mn: 25,000, Tg: 142° C., Eastman Chemical)
Elitel UE-3660 . . . 0.1 parts
(Polyester resin, Mn: 20,000, Unitika, Ltd.)
Methyl ethyl ketone . . . 89.9 parts Example 4

A protective layer transfer sheet of Example 4 was prepared in the same manner as Example 1 except that the ink for the adhesive layer had the following composition instead of that used in the protective layer transfer sheet of Example 1.

[Ink for Adhesive Layer]
Elitel UE-9800 . . . 10.0 parts
(Polyester resin, Unitika, Ltd.)
Ethyl acetate . . . 60.0 parts
Propylene glycol monopropylether . . . 30.0 parts Example 5

A protective layer transfer sheet of Example 5 was prepared in the same manner as Example 1 except that the ink for the adhesive layer had the following composition instead of that used in the protective layer transfer sheet of Example 1.

[Ink for Adhesive Layer]
Elitel UE-9800 . . . 10.0 parts
(Polyester resin, Unitika, Ltd.)
Tetrahydrofuran . . . 60.0 parts
Ethylcellosolve . . . 30.0 parts Comparative Example 1

A protective layer transfer sheet of Comparative Example 1 was prepared in the same manner as Example 1 except that the ink for the peeling layer had the following composition instead of that used in the protective layer transfer sheet of Example 1.

[Ink for Peeling Layer]
Dianal BR-84 . . . 10.0 parts
(Acryl resin, Tg: 105° C., Mitsubishi Rayon Co., Ltd.)
Elitel UE-9900 . . . 0.1 parts
(Polyester resin, Mn: 15,000, Unitika, Ltd.)
Methyl ethyl ketone . . . 89.9 parts Comparative Example 2

A protective layer transfer sheet of Comparative Example 2 was prepared in the same manner as Example 1 except that the ink for the peeling layer had the following composition instead of that used in the protective layer transfer sheet of Example 1.

[Ink for Peeling Layer]
CAP-504-0.2 . . . 10.0 parts
(Cellulose acetate propionate resin, Mn: 15,000, Tg: 159° C., Eastman Chemical)
Elitel UE-9900 . . . 0.1 parts
(Polyester resin, Mn: 15,000, Unitika, Ltd.)
Methyl ethyl ketone . . . 89.9 parts Comparative Example 3

A protective layer transfer sheet of Comparative Example 3 was prepared in the same manner as Example 1 except that the ink for the peeling layer had the following composition instead of that used in the protective layer transfer sheet of Example 1.

[Ink for Peeling Layer]
CAP-482-20 . . . 10.0 parts
(Cellulose acetate propionate resin, Mn: 75,000, Tg: 147° C., Eastman Chemical)
Elitel UE-9900 . . . 0.1 parts
(Polyester resin, Mn: 15,000, Unitika, Ltd.)
Methyl ethyl ketone . . . 89.9 parts Comparative Example 4

A protective layer transfer sheet of Comparative Example 4 was prepared in the same manner as Example 1 except that the ink for the peeling layer had the following composition instead of that used in the protective layer transfer sheet of Example 1.

[Ink for Peeling Layer]
CAP-482-0.5 . . . 10.0 parts
(Cellulose acetate propionate resin, Mn: 15,000, Tg: 142° C., Eastman Chemical)
Vylon 220 . . . 0.1 parts
(Polyester resin, Mn: 3,000, Toyobo Co., Ltd.)
Methyl ethyl ketone . . . 89.9 parts Comparative Example 5

A protective layer transfer sheet of Comparative Example 5 was prepared in the same manner as Example 1 except that the ink for the peeling layer had the following composition instead of that used in the protective layer transfer sheet of Example 1.
[Ink for Adhesive Layer]
Elitel UE-9800 . . . 10.0 parts
(Polyester resin, Unitika, Ltd.)
Methyl ethyl ketone . . . 90.0 parts Comparative Example 6

A protective layer transfer sheet of Comparative Example 6 was prepared in the same manner as Example 1 except that the ink for the peeling layer had the following composition instead of that used in the protective layer transfer sheet of Example 1.
[Ink for Adhesive Layer]
Elitel UE-9800 . . . 10.0 parts
(Polyester resin, Unitika, Ltd.)
Ethylcellosolve . . . 90.0 parts
<Preparation of Transfer-Receiving Body>
Ink composition for an image receiving layer was prepared with the following composition, and applied and dried on a white foam polyethylene terephthalate film of 188 μm thickness so that the dry film thickness of the image receiving layer was 4.0 μm. Thus, a transfer-receiving body was prepared.
[Ink for Image Receiving Layer]
Solbin C . . . 19.8 parts
(Vinyl chloride-vinyl acetate copolymer resin, Nissin Chemical Industry Co., Ltd.)
KF-393 . . . 0.2 parts
(Amino-modified silicone oil, Shin-Etsu Chemical Co., Ltd.)
Methyl ethyl ketone . . . 40.0 parts
Toluene . . . 40.0 parts
<Preparation of Printed Matter>
Protective layer transfer sheets prepared in Examples 1 to 5 and Comparative Examples 1 to 6 were superposed on the transfer-receiving bodies. A thermal printer for evaluation was used to produce a printed matter with a resolution of 300×300 DPI, printing speed of 10 msec/line, and thermal energy of transfer of 0.40 mJ/dot or 0.60 mJ/dot.
<Glossiness Evaluation>
The glossiness of the printed matter produced using the protective layer transfer sheets of Examples 1 to 5 and Comparative Examples 1 to 6 was measured under the following apparatus and conditions.
Glossmeter (Rhopoint IQ, manufactured by Rhopoint Instruments Ltd.)
Angle: 60°
<Plasticizer Resistance>
A vinyl chloride sheet to which a plasticizer had been added was placed on the surface of printed matter prepared using the protective layer transfer sheets of Examples 1 to 5 and Comparative Examples 1 to 6, and kept for 2 days under a load of 100 g/cm2 applied, in an environment at 50° C. After removal from the 50° C. environment, the printed matter was visually examined for deterioration caused by the plasticizer.
Evaluation was made on the basis of the following criteria.

Good: No missing color found in printed matter
Poor: Missing color found in printed matter
<Appearance Evaluation>
The image quality of the surface of the printed matter prepared using the protective layer transfer sheets of Examples 1 to 5 and Comparative Examples 1 to 6 was visually examined.
Evaluation was made on the basis of the following criteria.
Good: High image quality
Poor: Poor image quality due to lack of uniformity or foreign substance attributable to protective layer
<Cold Adhesiveness>
Cellotape (registered trademark) was adhered to the surface of the protective layer transfer sheet of Examples 1 to 5 and Comparative Examples 1 to 6, and then the adhered Cellotape (registered trademark) was peeled off to confirm cold adhesiveness between the substrate of the protective layer transfer sheet and the peeling layer.
Evaluation was made on the basis of the following criteria.
Good: The peeling layer does not peel off from the substrate.
Poor: The peeling layer peels off from the substrate.
<Residual Solvent>
The residual solvent of the protective layer transfer sheets of Examples 1 to 5 and Comparative Examples 1 to 6 was confirmed by gas chromatography. The evaluation was "good" when the residual solvent of the protective layer transfer sheet was found to contain both the good solvent and the poor solvent for the cellulose acetate propionate resin, and "poor" when found to contain only either the good solvent or the poor solvent.
Table 1 shows the evaluation results.

TABLE 1

| | Glossiness Thermal energy [mJ/dot] | | Plasticizer resistance | Appearance evaluation | Cold adhesiveness | Residual solvent |
|---|---|---|---|---|---|---|
| | 0.4 | 0.6 | | | | |
| Example 1 | 81 | 38 | Good | Good | Good | Good |
| Example 2 | 82 | 40 | Good | Good | Good | Good |
| Example 3 | 79 | 37 | Good | Good | Good | Good |
| Example 4 | 81 | 39 | Good | Good | Good | Good |
| Example 5 | 79 | 37 | Good | Good | Good | Good |
| Comparative Example 1 | 85 | — | Good | Good | Good | Good |
| Comparative Example 2 | — | 40 | Good | Good | Good | Good |
| Comparative Example 3 | 72 | 37 | Good | Poor | Good | Good |
| Comparative Example 4 | 81 | 38 | Good | Poor | Poor | Good |
| Comparative Example 5 | 79 | 37 | Poor | Poor | Poor | Poor |

As can be seen from the results shown in Table 1, in the thermally transferable protective layer composed of the peeling layer and the adhesive layer on one side of the substrate, when the peeling layer contains cellulose acetate resin having the glass transition temperature (Tg) of 140° C. or more and 150° C. or less and the number average molecular weight (Mn) of 30,000 or less, and polyester resin having the number average molecular weight of 15,000 or more, and the thermally transferable protective layer contains a good solvent and a poor solvent for the cellulose acetate propionate resin as a residual solvent, it is possible to obtain glossy printed matter and matte printed matter and printed matter having plasticizer resistance. Thus, the effects of the present invention were confirmed.

On the other hand, in the protective layer transfer sheet of Comparative Example 1, when a thermal energy (10 msec/line, 0.60 mJ/dot) was applied by a printer, fusion occurred between the substrate and the peeling layer since the Tg of the resin used for the peeling layer was 105° C. Accordingly, the peeling layer became unable to be peeled off from the substrate, which caused abnormal stop of the printer during peeling.

Further, in the protective layer transfer sheet of Comparative Example 2, when a thermal energy (10 msec/line, 0.40 mJ/dot) was applied by a printer, the peeling layer did not soften since the Tg of the resin used for the peeling layer was 159° C. Accordingly, the peeling layer remained in contact with the substrate and did not peel off, which caused abnormal stop of the printer during peeling.

In the protective layer transfer sheet of Comparative Example 3, in which the cellulose acetate propionate resin having the number average molecular weight (Mn) of 75,000 was used as a peeling layer, the viscosity of ink was increased when dissolved in an organic solvent, which caused poor leveling and poor uniform application. As a result, the uniformity of the surface of the printed matter was lost, and the image quality in the printed matter was degraded.

In the protective layer transfer sheet of Comparative Example 4, in which the number average molecular weight (Mn) of the polyester resin added to the peeling layer was 3,000, adhesion between the cellulose acetate propionate resin and the substrate was insufficient, and the foil cutting properties during thermal transfer was poor. Accordingly, a foreign substance attributable to the thermal transferable protective layer was generated in the printer, which caused defects in the printed matter.

In the protective layer transfer sheet of Comparative Example 5, in which the residual solvent of the thermally transferable protective layer only contained a good solvent for the cellulose acetate propionate resin, the coating liquid for the adhesive layer eroded the peeling layer and reduced the plasticizer resistance of the thermally transferable protective layer. In addition, cold adhesiveness between the cellulose acetate propionate resin and the substrate before transfer decreased.

In the protective layer transfer sheet of Comparative Example 6, in which the residual solvent of the thermally transferable protective layer only contained a poor solvent for the cellulose acetate propionate resin, adhesiveness between the peeling layer and the adhesive layer was weakened, and peeling occurred between the peeling layer and the adhesive layer during thermal transfer.

REFERENCE SIGNS LIST

1: protective layer transfer sheet; 2: substrate; 3: heat-resistant lubricating layer; 4: peeling layer; 5: adhesive layer; 6: thermally transferable protective layer.

What is claimed is:

1. A protective layer transfer sheet comprising:
a heat-resistant lubricating layer provided on a first surface of a substrate, and a thermally transferable protective layer provided on at least part of a second surface of the substrate, wherein
the thermally transferable protective layer includes a peeling layer and an adhesive layer, and
the peeling layer contains cellulose acetate resin having a glass transition temperature (Tg) of 140° C. or more and 150° C. or less and a number average molecular weight (Mn) of 30,000 or less, and polyester resin having a number average molecular weight of 15,000 or more.

2. The protective layer transfer sheet of claim 1, wherein the peeling layer contains the polyester resin added at the ratio of 0.1 parts by mass or more and 5.0 parts by mass or less with respect to 100 parts by mass of the cellulose acetate propionate resin.

3. The protective layer transfer sheet of claim 1, wherein the thermally transferable protective layer contains a good solvent and a poor solvent for the cellulose acetate propionate resin as a residual solvent which remains in the thermally transferable protective layer.

4. A method for producing a protective layer transfer sheet which includes a heat-resistant lubricating layer provided on a first surface of a substrate, and a thermally transferable protective layer provided on at least part of a second surface of the substrate, the thermally transferable protective layer including a peeling layer and an adhesive layer, the method comprising:
forming the peeling layer by applying a coating liquid for forming the peeling layer that contains cellulose acetate resin having a glass transition temperature (Tg) of 140° C. or more and 150° C. or less and a number average molecular weight (Mn) of 30,000 or less, and polyester resin having a number average molecular weight of 15,000 or more added thereto; and
forming the adhesive layer by applying a coating liquid for forming the adhesive layer on the peeling layer, wherein
both a good solvent and a poor solvent for the cellulose acetate propionate resin are used for the coating liquid for forming the adhesive layer.

* * * * *